Figures 1, 2:
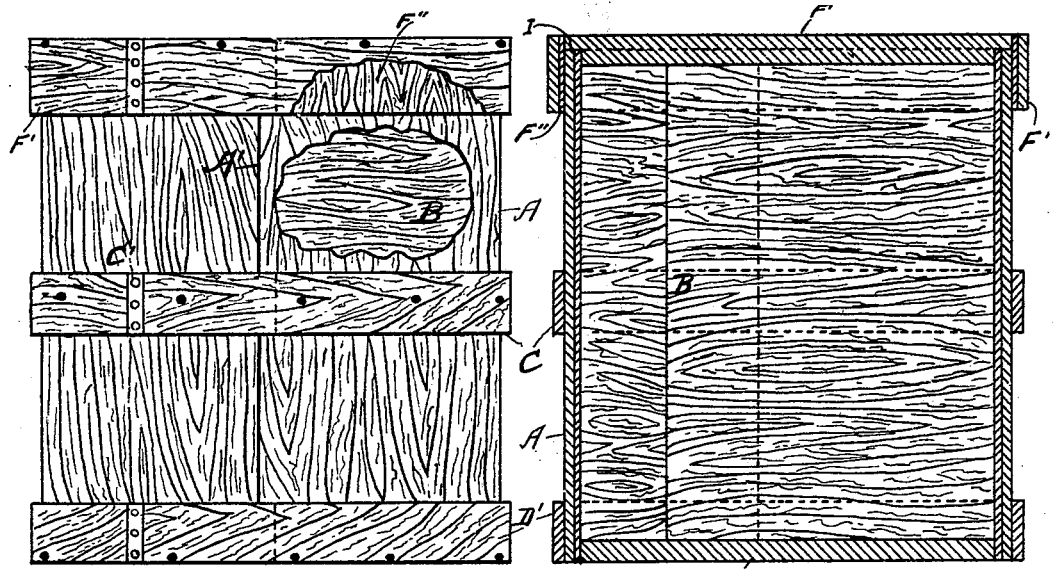

No. 683,517. Patented Oct. 1, 1901.
W. H. STOUT.
CHEESE BOX.
(Application filed May 31, 1901.)

(No Model.)

WITNESSES.  
INVENTOR.  
his ATTORNEY.

UNITED STATES PATENT OFFICE.

WILLIAM H. STOUT, OF DAYTON, OHIO.

CHEESE-BOX.

SPECIFICATION forming part of Letters Patent No. 683,517, dated October 1, 1901.

Application filed May 31, 1901. Serial No. 62,461. (No model.)

*To all whom it may concern:*

Be it known that I, WILLIAM H. STOUT, a citizen of the Dominion of Canada, residing at Dayton, in the county of Montgomery and State of Ohio, have invented certain new and useful Improvements in Cheese-Boxes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in cheese-boxes.

Cheese-boxes as heretofore constructed afford imperfect protection to the cheese packed therein for shipment. This is due in the main to the construction of the box, the material of which the wall is constructed becoming broken or splitting during shipment, with the result that the cheese becomes exposed and reaches the destination in a more or less damaged condition.

The present invention is designed chiefly to supply a demand for a packing-case for cheese for foreign shipments. Preparatory to shipments of cheese to foreign ports the cheese-packages are placed in cold-storage rooms, where the boxes are subjected to a very low temperature, which has a damaging effect on the wood thereof.

The object, therefore, of the present invention is twofold: first, to provide a cheese box or package which will remain intact and in a substantial condition during long shipments, to the end that the cheese will be preserved in a satisfactory condition, and, secondly, to provide a cheese-box that may be subjected to the temperature of cold-storage rooms without endangering the durability of the structure.

To obtain these results, the invention consists in placing together two veneers, the grain of one lying at right angles to that of the other, the outer veneer being essentially the thickest in order to form the main body or sustaining-wall of the box, and the inner veneer being essentially thin and providing a protecting inner wall or covering for the cheese. The purpose of the inner wall, as stated, is to provide a protecting-inclosure for the cheese in the event the outer wall should become broken or damaged under the rough handling to which cheese-boxes are usually subjected. The inner wall is not intended to furnish the main strength of the box. Therefore veneering of a much thinner quality is used. These two veneers of different thicknesses are rolled together in cylindrical form, but are not united. On the contrary, they comprise two cylinders, one within the other. Therefore one veneer may be affected by the temperature, for example, of a cold-storage room without having any effect on the other veneer. In other words, the veneers not being united may have degrees of contraction and expansion independent of each other.

The improvements will be hereinafter described and claimed in connection with the accompanying drawings.

Preceding a detail description of my invention reference is made to the accompanying drawings, of which—

Figure 3:
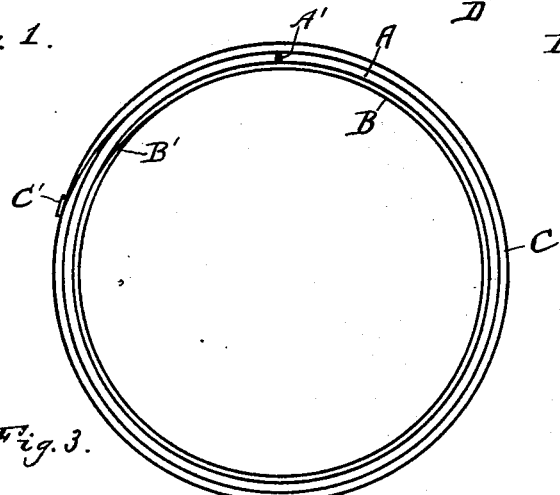
Figure 4:

Figure 1 is a longitudinal elevation of my improved cheese-box, portions of the outer veneers being broken away to show the inner veneer, the grain of both veneers being clearly shown in this view. Fig. 2 is a longitudinal sectional elevation of the box, showing the grain of the inner veneer. Fig. 3 is a top view with the cover removed, showing the joints of the veneers. Fig. 4 is a sectional view of the cover.

The box or package is of cylindrical form.

A designates an outer layer or veneer of wood, the grain of which extends vertically. The said outer veneer A constitutes the main body of the box. Therefore it consists, essentially, of a substantial thickness, and the ends thereof are connected by a flush-joint A', which provides an even interior surface.

B designates an inner veneer, the grain of which extends horizontally or at right angles to the direction of the grain of the outer veneer.

It will be observed from Fig. 2 of the drawings that the outer veneer is much thicker than the inner veneer. This is an important feature of the construction, for the reason, before stated, that the outer veneer provided the main support for the box and constitutes the main sustaining-wall in the structure. The inner veneer B constitutes a protecting-wall or covering for the cheese in case the outer sustaining-wall should become damaged. In such event the cheese would still be protected by said inner wall. The ends of the inner veneer B overlap, as at B', Fig. 3. These two veneers so arranged are rolled compactly together in cylindrical form, as in Fig. 3, and are inclosed by a central band or hoop C, which reinforces the middle of the box or package, the said band C having its ends overlapped and secured by a metallic strip C', through which a suitable number of tacks or nails are driven and clenched on the inside of the inner veneer. The inner veneer not being designed to contribute to the main strength of the box, it is not united to the outer veneer when the two veneers are rolled together. It will therefore be seen that the inner or thinner veneer may be affected by the cold temperature hereinbefore mentioned without detracting from the durability of the outer wall. The bottom D is permanently attached to the cylinder thus formed of two veneers A and B by being placed within the lower extreme end of said cylinder and secured thereto by a circular band or hoop D', which surrounds the outer circumference of the cylinder. A suitable number of nails are driven through this band D' and into the edges of the bottom and through both veneers. The cover F has a circular band or hoop constructed of two veneers F' and F''', the outer veneer being substantially the thickest and the grain thereof running horizontally in order that the cover may have the required strength.

The purpose of the inner veneer F'' of the cover is similar to the purpose of the inner veneer of the box—namely, it serves as a protection to the contents of the box rather than to furnish the requisite strength for said box. The grain of the inner veneer extends at right angles to that of the outer veneer for the same purpose expressed in connection with the veneering of which the box is constructed. The inner veneer F'' of said cover has a flush joint, while the outer veneer has a lap joint. It is obvious that this manner of joining the veneers may be reversed in the construction of the box, owing to the necessity for having a proper fit of the cover upon said box. The veneers F' and F'' so assembled are united to the cover by a suitable number of nails. The inner side of the cover is provided with a suitable annular rabbet I, which receives the edges of the veneers constituting the cylinder or box, when said cover is placed in position thereon. The cover, therefore, in addition to forming an inclosure for said box also reinforces the mouth of the box by maintaining it in position against any inward or outward pressure on the sides thereof.

I am aware that it is not new to construct packages of two veneers of equal thickness the grains of which extend in different directions. Therefore I do not desire to claim such construction.

Having described my invention, I claim—

1. As a new article of manufacture, a cylindrical cheese-box consisting of two veneers, the grain of one veneer extending at right angles to that of the other, the outer veneer being essentially thicker than the inner veneer and constituting the main supporting-wall of the box, and the inner veneer constituting an inner protecting wall or covering for the cheese, the adjacent surfaces of said veneers being disconnected, a bottom within said box, and a removable cover having an annular band constructed of two veneers, and an annular groove, the outer circumference of which is inclosed by said band, the said groove being adapted to receive the upper edges of the box, substantially as specified.

2. In a cheese-box, the combination of a cylindrical body formed of two wood veneers, the outer veneer being essentially thicker than the inner veneer and constituting the main body of the box, and the inner veneer constituting a protecting-wall for the contents of the box, said veneers being disconnected, a removable cover for said box consisting of one piece having an annular band constructed of two veneers, an annular groove provided in said cover adjacent to the inner side of said band so that said band provides an outer inclosing wall for said groove, the said groove being adapted to receive the mouth edges of the box and to provide a substantial inner support for said mouth edges while the said band provides a similar outer support for said edges, a bottom within said box, and supporting-bands surrounding the lower and middle portions of said box, substantially as described and shown.

In testimony whereof I affix my signature in presence of two witnesses.

WILLIAM H. STOUT.

Witnesses:
R. J. McCARTY,
WILLIAM A. SINCLAIR.